US004001609B2

United States Statutory Invention Registration [19]

[11] Reg. Number: H1609

Kondo

[45] Published: Nov. 5, 1996

[54] SILVER HALIDE PHOTOGRAPHIC EMULSION

[76] Inventor: Toshiya Kondo, c/o Konica Corporation 1 Sakura-machi, Hino-shi, Tokyo, Japan

[21] Appl. No.: 371,749

[22] Filed: Jan. 12, 1995

Related U.S. Application Data

[63] Continuation of Ser. No. 151,499, Nov. 12, 1993, abandoned.

[30] Foreign Application Priority Data

Dec. 3, 1992 [JP] Japan ..... 4-350005

[51] Int. Cl.[6] ..... G03C 1/005

[52] U.S. Cl. ..... 430/567

[58] Field of Search ..... 430/567

[56] References Cited

U.S. PATENT DOCUMENTS

| | | | |
|---|---|---|---|
| 5,068,173 | 11/1991 | Takehara et al. | 430/567 |
| 5,171,659 | 12/1992 | Tsaur et al. | 430/567 |
| 5,217,858 | 6/1993 | Maskasky | 430/567 |
| 5,219,720 | 6/1993 | Black et al. | 430/567 |
| 5,250,403 | 10/1993 | Antoniades et al. | 430/567 |

FOREIGN PATENT DOCUMENTS

| | | | |
|---|---|---|---|
| 410410 | 1/1991 | European Pat. Off. | G03C 1/035 |
| 492519 | 7/1992 | European Pat. Off. | G03C 1/015 |
| 550061 | 7/1993 | European Pat. Off. | G03C 1/005 |

*Primary Examiner*—Charles T. Jordan
*Assistant Examiner*—John R. Hardee

[57] ABSTRACT

Disclosed is a silver halide photographic light-sensitive emulsion comprising silver halide grains and a dispersant, wherein at least 50% of the total projected areas of the silver halide grains are occupied by tabular silver halide grains wherein the tabular silver halide grains each have two or more twin plane parallel to major plane of the tabular silver halide grains and an average distance between the two or more twin planes is not less than 130 Å and not more than 500 Å and a grain size distribution of the tabular silver halide grains is less than 20%.

20 Claims, No Drawings

SILVER HALIDE PHOTOGRAPHIC EMULSION

This application is a continuation of application number 08/151,499, filed Nov. 12, 1993.

FIELD OF THE INVENTION

The present invention relates to a silver halide photographic emulsion for silver halide photographic light-sensitive materials, more specifically a silver halide photographic emulsion used in silver halide photographic light-sensitive materials which show high sensitivity and excellent graininess after long-term storage following production thereof.

BACKGROUND OF THE INVENTION

With the recent popularization of photographic equipment such as cameras, there have been increased opportunities of taking pictures using silver halide photographic light-sensitive materials.

There has also been increasing demand for higher sensitivity and higher image quality.

The silver halide grain is a factor affecting the improvement in sensitivity and image quality of silver halide photographic light-sensitive materials. Traditionally, there have been attempts to develop silver halide grains offering improved sensitivity and image quality.

However, silver halide grain size reduction for image quality improvement, a common practice, tends to cause sensitivity reduction, posing a limitation on meeting the requirements of both high sensitivity and high image quality.

With the aim of achieving further improvement in sensitivity and image quality, there have been investigations of improving the sensitivity/size ratio per silver halide grain, including the use of tabular silver halide grains as described in Japanese Patent Publication Open to Public inspection (hereinafter referred to as Japanese Patent O.P.I. Publication) Nos. 111935/1983, 111936/1983, 111937/1983, 113927/1983 and 99433/1984.

In comparison with so-called normal crystal silver halide grains such as octahedral, decahedral or hexahedral grains, these tabular silver halide grains have a larger surface area per unit volume of silver halide grains, thus permitting adsorption of a larger amount of sensitizing dyes to the silver halide grain surface, which in turn offers an advantage of further sensitivity improvement.

Japanese Patent O.P.I. Publication No. 92942/1988 discloses an art in which a core of high silver iodide content is formed in tabular silver halide grains. Japanese Patent O.P.I. Publication No. 151618/1988 discloses an art using hexagonal tabular silver halide grains. These publications describe effects on sensitivity and graininess, respectively.

Also, Japanese Patent O.P.I. Publication Nos. 106746/1988 and 279237/1989 describe arts using tabular silver halide grains having a substantially layered structure parallel to the two mutually opposite major planes, or tabular silver halide grains having a layer structure divided by a plane substantially parallel to the two mutually opposite major planes wherein the average silver iodide content of the outermost layer is higher by at least 1 mol % than that of the whole silver halide grain, respectively.

Japanese Patent O.P.I. Publication No. 183644/1989 discloses an art using tabular silver halide grains characterized by a perfectly uniform silver iodide distribution in the silver halide composition containing silver iodide.

There are also some reports of arts concerning mutually parallel twin planes in tabular silver halide grains. For example, Japanese Patent O.P.I. Publication No. 163451/1988 discloses an art using tabular silver halide grains wherein the ratio (b/a) of grain thickness (b) to the longest distance (a) between two or more mutually parallel twin planes is not lower than 5. Japanese Patent O.P.I. Publication No. 201649/1989 discloses an art wherein the number of transition lines is also specified. These publications report on effects on sensitivity, graininess and sharpness.

WO91/18320 reports on an art using tabular silver halide grains wherein the distance between at least two twin planes is less than 0.012 microns. Japanese Patent Application No. 353043/1991 reports on an art using core/shell twin crystal silver halide grains wherein the average maximum twin plane distance is 10 to 100 Å. These publications describe improving effects on sensitivity and graininess, or sharpness, pressure properties and graininess, respectively.

In view of the present state of commercial distribution and consumption of silver halide photographic light-sensitive materials, it is very important to stably offer high sensitivity and high image quality at the time of silver halide photographic light-sensitive material purchase and actual picture taking by the user, i.e., after long-term storage on the market, rather than just after production, or at the time of shipment, of the silver halide photographic light-sensitive material.

Usually, this market storage time is about several months to 2 years. The prior art using conventional tabular silver halide grains is unsatisfactory in meeting the requirements for high sensitivity and high image quality as evaluated after long-term storage or in a severe forced deterioration test, though it is common practice to evaluate the photographic performance of the light-sensitive material after relatively short-term storage or in a mild forced deterioration test. In this situation, there has been demand for the development of a better art.

With this in mind, the present inventors investigated the above problems and found that it is effective in improving the sensitivity and graininess of tabular silver halide grains after long-term storage to define the average distance between two or more twin planes parallel to the major plane within an appropriate range and concurrently monodisperse the silver halide grains.

The present inventors also made investigations based on the assumption that photographic performance stability deterioration, particularly photographic performance deterioration after long-term storage, in a silver halide photographic light-sensitive material produced with a silver halide photographic emulsion containing conventional tabular silver halide grains, is associated with grain-to-grain dispersion of grain size distribution, and in the case of silver iodobromide, associated with grain-to-grain dispersion of silver iodide content, i.e., unevenness among the silver halide grains, and found that this unevenness is caused by too narrow a distance between two or more twin planes parallel to the major plane of the tabular grain.

Another finding was that when the distance between two or more twin planes parallel to the major plane is too wide, the tabular silver halide grains formed have an excessively low aspect ratio, which in turn hampers the improvement in sensitivity and image quality as a result of increase in the sensitivity/size ratio per silver halide grain, an aspect ratio which has been thought as a benefit from the use of tabular silver halide grains.

SUMMARY OF THE INVENTION

The object of the present invention is to provide a silver halide photographic emulsion for silver halide photographic light-sensitive materials which show high sensitivity and excellent graininess even after long-term storage following production thereof.

The above object of the present invention is accomplished by meeting any one of the following requirements:

(1) A silver halide photographic emulsion containing silver halide grains and a dispersant, wherein tabular silver halide grains account for not lower than 50% of the total projected area of the silver halide grains and the tabular silver halide grains wherein the average distance between two or more twin planes parallel to the major plane is not less than 130 Å and not more than 500 Å has a grain size distribution of less than 20%.

(2) The silver halide photographic emulsion of term 1 above wherein the tabular silver halide grains have therein a silver iodobromide phase containing silver iodide at not less than 10 mol % and not more than the solid solution limit.

(3) The silver halide photographic emulsion of term 1 above wherein the average silver iodide content of said tabular silver halide grains is not less than 4 mol % and not more than the solid solution limit.

DETAILED DESCRIPTION OF THE INVENTION

The present invention is hereinafter described in more detail.

Although the silver halide photographic emulsion of the present invention may incorporate any one of silver halides for common silver halide emulsions, such as silver bromide, silver iodobromide, silver iodochloride, silver chlorobromide, silver chloroiodobromide and silver chloride, the silver halide is preferably silver bromide, silver iodobromide or silver chloroiodobromide.

The silver halide grains contained in the silver halide photographic emulsion of the present invention may be those wherein a latent image is formed mainly on the surface thereof, or may be those wherein a latent image is formed mainly therein.

The silver halide grains contained in the silver halide photographic emulsion of the present invention are tabular silver halide grains. The tabular silver halide grain is crystallographically classified under the category of twin crystals.

In the present invention, a twin crystal is defined as a silver halide crystal wherein one or more twin planes are present in each grain. The morphological classification of twin crystals is described in detail by Klein and Meuzer in "Photographishe Korrespondenz", Vol. 99, p. 99 and Vol. 100, p.57.

The tabular silver halide grains of the present invention have two or more twin planes parallel to the major plane. Twin planes can be observed by transmission electron microscopy. Specifically, a silver halide photographic emulsion is coated on a support so that the major planes of the tabular silver halide grains contained therein are oriented almost parallel to the support. The thus-obtained sample is cut, using a diamond cutter, to yield thin sections of about 0.1 μm in thickness, which are observed for twin planes by transmission electron microscopy.

In the present invention, the average distance between two or more twin planes parallel to the major plane can be obtained by arithmetically averaging the figures for twin plane distance in randomly sampled 100 or more tabular silver halide grains having a cross section at nearly right angle to the major plane in the above-described observation of sections by transmission electron micrography.

In the present invention, the average distance between two or more twin planes parallel to the major plane of the tabular silver halide grains is not less than 130 Å and not more than 500 Å, preferably not less than 150 Å and not more than 400 Å, and more preferably not less than 170 Å and not more than 300 Å.

Tabular silver halide grains account for not lower than 50%, preferably not lower than 60%, more preferably not lower than 70%, and most preferably not lower than 80% of the total projected area of the silver halide grains contained in the silver halide photographic emulsion of the present invention.

In the present invention, a tabular silver halide grain is defined to have an average value of not less than 1.3, preferably not less than 1.5 and less than 5, more preferably not less than 1.7 and less than 5.0, and most preferably not less than 2.0 and less than 4.5 for the ratio of grain size to grain thickness (also referred to as aspect ratio).

In the present invention, silver halide grain size, expressed as the diameter of a circle converted from the projected area of the grain with the same area (the diameter of a circle having the same projected area as of the silver halide grain), is preferably 0.1 to 5.0 μm, more preferably 0.2 to 4.0 μm, and still more preferably 0.3 to 3.0 μm.

Grain size can be obtained by measuring the projected area of the grain on an electron micrograph taken at×10000 to 70000 magnification.

Also, average grain size (d) can be obtained using the following equation:

$$\text{Average grain size } (d) = \sum_{i=1}^{n} nidi/n$$

where n is the number of grains measured, di is a particular grain diameter and ni is the number of grains having a diameter of di.

The number of subject grains should be not less than 1000 randomly.

In the present invention, tabular silver halide grains wherein the distance between two or more twin planes parallel to the major plane is not less than 130 Å and not more than 500 Å has a grain size distribution of less than 20%.

In the present invention, grain size distribution is defined as follows:

Grain size distribution (%)=(grain size standard deviation/average grain size)×100

Grain size standard deviation is obtained as follows:

$$\text{Grain size standard deviation} = \sqrt{\sum_{i=1}^{n} (di - d)^2/n}$$

The grain size distribution is preferably less than 18%, more preferably less than 15%, and most preferably less than 13%.

The tabular silver halide grains contained in the silver halide photographic emulsion of the present invention preferably have therein a silver iodobromide phase containing silver iodide at not less than 10 mol % and not more than the solid solution limit.

In the present invention, the inside of a grain is defined as the inner portion corresponding to not more than 90%, preferably not more than 70%, and more preferably not more than 50% of the total volume of the grain.

In the present invention, the silver iodide content of the silver iodobromide phase is preferably not less than 10 mol % and not more than the solid solution limit, more preferably not less than 15 mol % and not more than the solid solution limit, and most preferably not less than 20 mol % and not more than the solid solution limit.

The silver halide grains contained in the silver halide photographic emulsion of the present invention are preferably so-called core/shell grains, in which silver iodide is localized in the inside thereof.

The average silver iodide content of the tabular silver halide grains contained in the silver halide photographic emulsion of the present invention is preferably not less than 1 mol % and not more than the solid solution limit, more preferably not less than 3 mol % and not more than 15 mol %, and most preferably not less than 4 mol % and not more than 12 mol %.

In producing the silver halide photographic emulsion of the present invention, seed grains can be used. Specifically, seed grains and an aqueous solution containing a protective colloid are previously provided in a reactor, and the seed grains are grown while supplying silver ions, halogen ions or silver halide micrograins as necessary. Seed grains for this purpose can be prepared by the single jet method, the controlled double jet method and other methods known to those skilled in the art. Although the seed grains have any silver halide composition, whether silver bromide, silver iodide, silver iodobromide, silver chlorobromide, silver chloroiodide or silver chloroiodobromide, silver bromide or silver iodobromide is preferred. In the case of silver iodobromide, the silver iodide content is preferably not less than 1 mol % and not more than the solid solution limit, more preferably not less than 2 mol % and not more than the solid solution limit, and most preferably not less than 4 mol % and not more than the solid solution limit.

In the present invention, the solid solution limit is expressed as the maximum possible mol % of iodide in the form of a solid solution in the silver halide. Specifically, the solid solution limit can be determined by the method described on page 4 of "The Theory of Photographic Process," ed., T. H. James, 4th edition (MacMillan). In the case of silver iodobromide, the solid solution limit can be obtained by the equation:

$$\text{Imax (mol \%)} = 34.5 + 0.165\,(t-25)$$

where t is temperature in centigrade.

Various methods well known to those skilled in the art can be used to form the silver halide photographic emulsion relating to the present invention. In other words, the single jet method, the double jet method, the triple jet method and others can be used in any combination. It is also possible to control the pH and pAg values of the liquid phase for silver halide formation according to the silver halide grain growth speed.

Although the silver halide photographic emulsion of the present invention can be produced by any of the acidic method, the neutral method or the ammoniacal method, preference is given to the acidic method or the neutral method.

In the present invention, twin plane distance can be regulated by choosing an appropriate combination of various factors such as gelatin concentration, temperature, iodine ion concentration, pBr, ion supply speed, impeller revolution rate and gelatin species. Generally, twin plane distance can be narrowed by increasing the degree of supersaturation in nucleation.

Details of supersaturation factors are given in, for example, Japanese Patent O.P.I. Publication Nos. 92942/1988 and 213637/1989.

In producing the silver halide photographic emulsion of the present invention, it is preferable to use the twin crystal seed grains described in Japanese Patent Application No. 341164/1990 or 15215/1992.

Also, stirring conditions are critical in producing the silver halide photographic emulsion of the present invention. It is necessary to use the mechanical stirrer disclosed in Japanese Patent O.P.I. Publication No. 160128/1987, for supplying an aqueous solution of silver salt and an aqueous solution of halide by the double jet method, and set the impeller revolution rate within an optimum range according to other supersaturation factors. Generally, an aspect ratio of a tabular silver halide grain can be freely controlled by pBr in grain growth or ion supply speed. In the present invention, twin plane distance is almost decided in silver nucleus formation.

In producing the silver halide photographic emulsion of the present invention, halide ions and silver ions may be added at the same time, or either may be added previously. Also, grains may be grown by sequentially or simultaneously adding halide ions and silver ions while controlling the pAg and pH in the mixing vessel in view of the critical silver halide crystal growth speed. The grain's silver halide composition may be changed by the conversion method at any stage of silver halide formation. Halide ions and silver ions, both in the form of silver halide micrograins, may be supplied to the mixing vessel.

In producing the silver halide photographic emulsion of the present invention, known silver halide solvents such as ammonia, thioether and thiourea may be present.

The silver halide grains incorporated in the silver halide photographic emulsion of the present invention may be supplemented with metal ions, using at least one salt selected from the group consisting of cadmium salt, zinc salt, lead salt, thallium salt, iridium salt (including complex salt), rhodium salt (including complex salt) and iron salt (including complex salt), to contain such metal elements in and/or on the grains during formation and/or growth of the silver halide grains. Also, reduction sensitization specks can be provided in and/or on the grains by bringing the grains in an appropriate reducing atmosphere.

In the present invention, it is preferable to use gelatin as a dispersant. Examples of gelatin for this purpose include alkali-treated gelatin, acid-treated gelatin, low molecular gelatin (molecular weight from 2000 to 100000) and modified gelatins such as phthalated gelatin. Non-gelatin hydrophilic colloids can also be used.

Specifically, the hydrophilic colloids specified in the present specification and those described in Term IX of Research Disclosure No. 17643 (December 1978) can be used.

The silver halide photographic emulsion of the present invention may, or may not, have unwanted soluble salts removed upon completion of silver halide grain growth. Such salts can be removed in accordance with the method described in Term II of Research Disclosure No. 17643.

In producing the silver halide photographic emulsion relating to the present invention, optimum conditions for items other than those described above can be chosen in accordance with known methods such as those described in Japanese Patent O.P.I. Publication Nos. 6643/1986, 14630/1986, 112142/1986, 157024/1987, 18556/1987, 92942/1988, 151618/1988, 163451/1988, 220238/1988 and 311244/1988.

The silver halide photographic emulsion of the present invention can be preferably used in silver halide color photographic light-sensitive materials.

In producing a color photographic light-sensitive material using the silver halide photographic emulsion of the present invention, the silver halide emulsion is used after physical ripening, chemical ripening and spectral sensitization. Additives used in these processes are described in Research Disclosure Nos. 17643, 18716 and 308119 (hereinafter referred to as RD17643, RD18716 and RD308119, respectively). The following table shows where the additives are described.

| Item | Page in RD308119 | RD17643 | RD18716 |
|---|---|---|---|
| Chemical sensitizer | 996, III-Term A | 23 | 648 |
| Spectral sensitizer | 996, IV-Terms A, B, C, D, H, I, J | 23–24 | 648–649 |
| Supersensitizer | 996, IV-Terms A, E, J | 23–24 | 648–649 |
| Antifogging agent | 998, VI | 24–25 | 649 |
| Stabilizer | 998, VI | 24–25 | 649 |

Known photographic additives which can be used in making a color photographic light-sensitive material using the silver halide photographic emulsion of the present invention are also described in the above Research Disclosure numbers. The following table shows where they are described.

| Item | Page in RD308119 | RD17643 | RD18716 |
|---|---|---|---|
| Antistaining agent | 1002, VII-Term I | 25 | 650 |
| Dye image stabilizer | 1001, VII-Term J | 25 | |
| Brightening agent | 998, V | 24 | |
| Ultraviolet absorbent | 1003, VIII-Term C, XIII-Term C | 25–26 | |
| Light absorbent | 1003, VIII | 25–26 | |
| Light scattering agent | 1003, VIII | | |
| Filter dye | 1003, VIII | 25–26 | |
| Binder | 1003, IX | 26 | 651 |
| Antistatic agent | 1006, XIII | 27 | 650 |
| Hardener | 1004, X | 26 | 651 |
| Plasticizer | 1006, XII | 27 | 650 |
| Lubricant | 1006, XII | 27 | 650 |
| Activator, coating aid | 1005, XI | 26–27 | 650 |
| Matting agent | 1007, XVI | | |
| Developing agent (contained in the light-sensitive material) | 1011, XX-Term B | | |

In making a color photographic light-sensitive material using the silver halide photographic emulsion of the present invention, various couplers may be incorporated therein. Examples thereof are specified in the above Research Disclosure Numbers. The following table shows where they are described.

| Item | Page in RD308119 | RD17643 |
|---|---|---|
| Yellow coupler | 1001, VII-Term D | VII-Terms C–G |
| Magenta coupler | 1001, VII-Term D | VII-Terms C–G |
| Cyan coupler | 1001, VII-Term D | VII-Terms C–G |
| Colored coupler | 1002, VII-Term G | VII-Term G |
| DIR coupler | 1001, VII-Term F | VII-Term F |
| BAR coupler | 1002, VII-Term F | |
| Other couplers which release a useful residue | 1001, VII-Term F | |
| Alkali-soluble coupler | 1001, VII-Term E | |

The additives used in making a color photographic light-sensitive material using the silver halide photographic emulsion of the present invention can be added by the dispersing method described in RD308119 XIV and other methods.

In making a color photographic light-sensitive material using the silver halide photographic emulsion of the present invention, the supports described on page 28 of RD17643, pages 647 and 648 of RD18716, and RD308119 XIX can be used.

The color photographic light-sensitive material prepared with the silver halide photographic emulsion of the present invention may be provided with auxiliary layers such as filter layers and interlayers as described in RD308119, VII-Term K.

The color photographic light-sensitive material prepared with the silver halide photographic emulsion of the present invention can have various layer structures such as the ordinary layer structure, reverse layer structure and unit structure described in the above RD308119 VII-K.

The silver halide photographic emulsion of the present invention is preferably applicable to various color light-sensitive materials represented by color negative films for ordinary or movie use, color reversal films for slides or televisions, color printing papers, color positive films, and color reversal papers.

The color photographic light-sensitive material incorporating the silver halide photographic emulsion of the present invention can be developed by the ordinary processes described on pages 28 and 29 of the above RD17643, page 647 of RD18716 and RD308119 XIX.

EXAMPLES

The present invention is hereinafter described in more detail by means of the following examples, but the scope of the invention is not limited to these examples.

Example 1

(1) Preparation of comparative emulsion Em-1

By the method described in Example 1 in the specification for Japanese Patent Application No. 353043/1991, a silver halide photographic emulsion containing core/shell tabular silver halide grains was prepared.

(2) Preparation of comparative emulsion Em-2

By the method described in Example 1 in the specification for Japanese Patent Application No. 238443/1991, a silver halide photographic emulsion containing core/shell tabular silver halide grains was prepared.

(3) Preparation of twin crystal seed emulsion T-1

In accordance with the description in the specification for Japanese Patent Application No. 341164/1991, a seed emulsion comprising grains having two mutually parallel twin planes was prepared as follows:

| Solution A | |
|---|---|
| Ossein gelatin | 80.0 g |
| Potassium bromide | 47.4 g |
| 10% methanol solution of sodium salt of polyisopropylene-polyethyleneoxy-disuccinate | 0.48 ml |

Water was added to make a total quantity of 8000.0 ml.

| Solution B | |
|---|---|
| Silver nitrate | 1200.0 g |

Water was added to make a total quantity of 1600.0 ml.

| Solution C | |
|---|---|
| Ossein gelatin | 32.2 g |
| Potassium bromide | 790.0 g |
| Potassium iodide | 70.34 g |

Water was added to make a total quantity of 1600.0 ml.

| Solution D | |
|---|---|
| Aqueous ammonia | 470.0 ml |

While stirring solution A at an impeller revolution rate of 1000 rpm at 40° C. using the mechanical stirrer described in Japanese Patent O.P.I. Publication No. 160128/1987, solutions B and C were added by the double jet method over a period of 14 minutes to form nuclei. During this operation, a pBr of 1.60 was maintained.

The temperature was then lowered to 20° C. over a period of 30 minutes. Solution D was then added over a period of 1 minute, followed by 5 minutes of ripening.

After completion of the ripening, the mixture was adjusted to pH 6.0 and then desalinized by a conventional method. These seed emulsion grains had an average grain size of 0.225 μm.

(4) Preparation of twin crystal seed emulsion T-2

In accordance with the description in the specification for Japanese Patent Application No. 341164/1991, a seed emulsion comprising grains having two mutually parallel twin planes was prepared as follows:

| Solution A | |
|---|---|
| Ossein gelatin | 80.0 g |
| Potassium bromide | 47.4 g |
| 10% methanol solution of sodium salt of polyisopropylene-polyethyleneoxy-disuccinate | 0.48 ml |

Water was added to make a total quantity of 8000.0 ml.

| Solution B | |
|---|---|
| Silver nitrate | 1200.0 g |

Water was added to make a total quantity of 1600.0 ml.

| Solution C | |
|---|---|
| Ossein gelatin | 32.2 g |
| Potassium bromide | 790.0 g |
| Potassium iodide | 70.34 g |

Water was added to make a total quantity of 1600.0 ml.

| Solution D | |
|---|---|
| Aqueous ammonia | 470.0 ml |

While stirring solution A at an impeller revolution rate of 1000 rpm at 40° C., using the mechanical stirrer described in Japanese Patent O.P.I. Publication No. 160128/1987, solutions B and C were added by the double jet method over a period of 10.8 minutes to form nuclei. During this operation, a pBr of 1.60 was maintained.

The temperature was then lowered to 20° C. over a period of 30 minutes. Solution D was then added over a period of 1 minute, followed by 5 minutes of ripening.

After completion of the ripening, the mixture was adjusted to pH 6.0 and then desalinized by a conventional method. These seed emulsion grains had an average grain size of 0.220 μm.

(5) Preparation of twin crystal seed emulsion T-3

In accordance with the description in the specification for Japanese Patent Application No. 341164/1991, a seed emulsion comprising grains having two mutually parallel twin planes was prepared as follows:

| Solution A | |
|---|---|
| Ossein gelatin | 80.0 g |
| Potassium bromide | 47.4 g |
| 10% methanol solution of sodium salt of polyisopropylene-polyethyleneoxy-disuccinate | 0.48 ml |

Water was added to make a total quantity of 8000.0 ml.

| Solution B | |
|---|---|
| Silver nitrate | 1200.0 g |

Water was added to make a total quantity of 1600.0 ml.

| Solution C | |
|---|---|
| Ossein gelatin | 29.0 g |
| Potassium bromide | 790.0 g |
| Potassium iodide | 70.34 g |

Water was added to make a total quantity of 1600.0 mi.

| Solution D | |
|---|---|
| Aqueous ammonia | 470.0 ml |

While stirring solution A at an impeller revolution rate of 700 rpm at 40° C., using the mechanical stirrer described in Japanese Patent O.P.I. Publication No. 160128/1987, solutions B and C were added by the double jet method over a period of 10.8 minutes to form nuclei. During this operation, a pBr of 1.60 was maintained. The temperature was then lowered to 20° C. over a period of 30 minutes. Solution D was then added over a period of 1 minute, followed by 5 minutes of ripening. After completion of the ripening, the mixture was adjusted to pH 6.0 and then desalinized by a conventional method. These seed emulsion grains had an average grain size of 0.217 μm.

(6) Preparation of twin crystal seed emulsion T-4

In accordance with the description in the specification for Japanese Patent Application No. 341164/1991, a seed emulsion comprising grains having two mutually parallel twin planes was prepared as follows:

| Solution A | |
|---|---|
| Ossein gelatin | 80.0 g |
| Potassium bromide | 47.4 g |
| 10% methanol solution of sodium salt of polyisopropylene-polyethyleneoxy-disuccinate | 0.48 ml |

Water was added to make a total quantity of 8000.0 ml.

| Solution B | |
|---|---|
| Silver nitrate | 1200.0 g |

Water was added to make a total quantity of 1600.0 ml.

| Solution C | |
|---|---|
| Ossein gelatin | 22.5 g |
| Potassium bromide | 790.0 g |
| Potassium iodide | 70.34 g |

Water was added to make a total quantity of 1600.0 ml.

| Solution D | |
|---|---|
| Aqueous ammonia | 470.0 ml |

While stirring solution A at an impeller revolution rate of 650 rpm at 40° C., using the mechanical stirrer described in Japanese Patent O.P.I. Publication No. 160128/1987, solutions B and C were added by the double jet method over a period of 10.8 minutes to form nuclei. During this operation, a pBr of 1.60 was maintained.

The temperature was then lowered to 20° C. over a period of 30 minutes. Solution D was then added over a period of 1 minute, followed by 5 minutes of ripening.

After completion of the ripening, the mixture was adjusted to pH 6.0 and then desalinized by a conventional method. These seed emulsion grains had an average grain size of 0.218 μm.

(7) Preparation of twin crystal seed emulsion T-5

In accordance with the description in the specification for Japanese Patent Application No. 341164/1991, a seed emulsion comprising grains having two mutually parallel twin planes was prepared as follows:

| Solution A | |
|---|---|
| Ossein gelatin | 80.0 g |
| Potassium bromide | 47.4 g |
| 10% methanol solution of sodium salt of polyisopropylene-polyethyleneoxy-disuccinate | 0.48 ml |

Water was added to make a total quantity of 8000.0 ml.

| Solution B | |
|---|---|
| Silver nitrate | 1200.0 g |

Water was added to make a total quantity of 1600.0 ml.

| Solution C | |
|---|---|
| Ossein gelatin | 32.2 g |
| Potassium bromide | 790.0 g |
| Potassium iodide | 70.34 g |

Water was added to make a total quantity of 1600.0 ml.

| Solution D | |
|---|---|
| Aqueous ammonia | 470.0 ml |

While stirring solution A at an impeller revolution rate of 600 rpm at 40° C., using the mechanical stirrer described in Japanese Patent O.P.I. Publication No. 160128/1987, solutions B and C were added by the double jet method over a period of 7.7 minutes to form nuclei. During this operation, a pBr of 1.60 was maintained.

The temperature was then lowered to 20° C. over a period of 30 minutes. Solution D was then added over a period of 1 minute, followed by 5 minutes of ripening.

After completion of the ripening, the mixture was adjusted to pH 6.0 and then desalinized by a conventional method. These seed emulsion grains had an average grain size of 0.207 μm.

(8) Preparation of twin crystal seed emulsion T-6

In accordance with the description in the specification for Japanese Patent Application No. 341164/1991, a seed emulsion comprising grains having two mutually parallel twin planes was prepared as follows:

| Solution A | |
|---|---|
| Ossein gelatin | 80.0 g |
| Potassium bromide | 47.4 g |
| 10% methanol solution of sodium salt of polyisopropylene-polyethyleneoxy-disuccinate | 0.48 ml |

Water was added to make a total quantity of 8000.0 ml.

| Solution B | |
|---|---|
| Silver nitrate | 1200.0 g |

Water was added to make a total quantity of 1600.0 ml.

| Solution C | |
|---|---|
| Ossein gelatin | 32.2 g |
| Potassium bromide | 790.0 g |
| Potassium iodide | 70.34 g |

Water was added to make a total quantity of 1600.0 ml.

| Solution D | |
|---|---|
| Aqueous ammonia | 470.0 ml |

While stirring solution A at an impeller revolution rate of 500 rpm at 40° C. using the mechanical stirrer described in Japanese Patent O.P.I. Publication No. 160128/1987, solutions B and C were added by the double jet method over a period of 5.6 minutes to form nuclei. During this operation, a pBr of 1.60 was maintained. The temperature was then lowered to 20° C. over a period of 30 minutes. Solution D was then added over a period of 1 minute, followed by 4 minutes of ripening.

After completion of the ripening, the mixture was adjusted to pH 6.0 and then desalinized by a conventional method. These seed emulsion grains had an average grain size of 0.211 μm.

(9) Preparation of inventive emulsion Em-3

Using the following seven solutions, a silver halide photographic emulsion comprising core/shell tabular silver halide grains was prepared.

| Solution A | |
|---|---|
| Ossein gelatin | 123.6 g |
| Distilled water | 2551 ml |
| 10% methanol solution of sodium salt of polyisopropylene-polyethyleneoxy-disuccinate | 0.7 ml |

Solution B 3.5 N aqueous solution of silver nitrate

Solution C 3.5 N aqueous solution of potassium bromide containing 4.0% by weight gelatin

| Solution D | |
|---|---|
| Fine grain emulsion comprising 3.1% by weight of gelatin and silver iodide grains (average grain size 0.05 μm) | 1.123 mol |

This fine grain emulsion was prepared as follows:

To 1054 ml of a 5.0% by weight gelatin solution containing 0.027 mol of potassium iodide, 318 ml of an aqueous solution containing 1.123 mol of silver nitrate and 318 ml of an aqueous solution containing 1.108 mol of potassium iodide were added over a period of 35 minutes, while maintaining a temperature of 40° C.

| Solution E | |
|---|---|
| Fine grain emulsion comprising 4.5% by weight of gelatin and silver iodobromide micrograins (average grain size 0.04 μm, silver iodide content 1 mol %) | 2.93 mol |

This fine grain emulsion was prepared as follows:

To 2003 ml of a 9.3% by weight aqueous gelatin solution containing 0.0256 mol of potassium bromide, 836 ml of an aqueous solution containing 2.93 mol of silver nitrate and 836 ml of an aqueous solution containing 3.08 mol of potassium bromide and 0.029 mol of silver iodide were added over a period of 10 minutes. During fine grain formation, pH was maintained at 3.0 with nitric acid, and temperature maintained at 30° C. After grain formation, an aqueous solution of sodium carbonate was added to obtain a pH of 6.0.

| Solution F | |
|---|---|
| 1.75 N aqueous solution of potassium bromide | Necessary amount |
| Solution G-1 | |
| Seed emulsion T-1 | 0.0694 mol |

To solution A being kept at 75° C. in a reaction vessel, solution G-1 was added, after which solutions B, C and D were added by the triple jet precipitation method over a period of 191 minutes, followed by addition of solution E alone at constant rate over a period of 10 minutes.

Solutions B and C were added at an appropriate rate changed as a function of time according to the critical rate of grain growth to prevent both the occurrence of small grains other than growing seed crystals and polydispersion due to Ostwald ripening. Silver halide photographic emulsions containing core/shell tabular silver halide grains of multiple layer structure were prepared by setting the ratio of solution D addition speed to solution B addition speed so that the silver halide phase had silver iodide contents (mol %) shown in Table 1.

During silver halide grain growth, solution F was added as appropriate to regulate pAg as shown in Table 1.

After grain formation, desalinization was performed by a conventional method, after which gelatin was again added for redispersion, and the dispersion was adjusted to pH 5.80 and pAg 8.00 at 40° C.

Measurements of pAg and pH were made by conventional methods using a silver sulfide electrode and a glass electrode, respectively.

TABLE 1

| Addition time (min) | Amount of silver added (%) | Silver iodide content (mol %) | pAg |
|---|---|---|---|
| 0.0 | 0.0 | 6.0 | 8.8 |
| 46.9 | 4.0 | 15.2 | 8.8 |
| 91.1 | 11.0 | 30.0 | 8.8 |
| 122.5 | 18.0 | 30.0 | 8.8 |
| 153.1 | 28.0 | 18.1 | 8.8 |
| 172.4 | 38.0 | 8.0 | 8.8 |
| 172.4 | 38.0 | 0.0 | 8.8 |
| 181.2 | 54.0 | 0.0 | 8.8 |
| 185.3 | 64.0 | 0.0 | 8.8 |
| 191.0 | 79.0 | 0.0 | 8.8 |

(10) Preparation of inventive emulsion Em-4

A silver halide photographic emulsion comprising core/shell tabular silver halide grains was prepared in the same manner as for inventive emulsion Em-3 except that solution G-2 was used in place of solution G-1.

| Solution G-2 | |
|---|---|
| Seed emulsion T-2 | 0.0694 mol |

(11) Preparation of inventive emulsion Em-5

A silver halide photographic emulsion comprising core/shell tabular silver halide grains was prepared in the same manner as for inventive emulsion Em-3 except that solution G-3 was used in place of solution G-1.

| Solution G-3 | |
|---|---|
| Seed emulsion T-3 | 0.0694 mol |

(12) Preparation of inventive emulsion Em-6

A silver halide photographic emulsion comprising core/shell tabular silver halide grains was prepared in the same manner as for inventive emulsion Em-3 except that solution G-4 was used in place of solution G-1.

| Solution G-4 | |
|---|---|
| Seed emulsion T-4 | 0.0694 mol |

(13) Preparation of inventive emulsion Em-7

A silver halide photographic emulsion comprising core/shell tabular silver halide grains was prepared in the same manner as for inventive emulsion Em-3 except that solution G-5 was used in place of solution G-1 and that addition time, amount of silver added (%), silver iodide content (mol %) and pAg were regulated as shown in Table 2 during silver halide grain growth.

| Solution G-5 | |
|---|---|
| Seed emulsion T-5 | 0.0694 mol |

TABLE 2

| Addition time (min) | Amount of silver added (%) | Silver iodide content (mol %) | pAg |
|---|---|---|---|
| 0.0 | 0.0 | 6.0 | 8.6 |
| 51.6 | 4.0 | 15.2 | 8.6 |
| 100.2 | 11.0 | 30.0 | 8.6 |
| 134.8 | 18.0 | 30.0 | 8.6 |
| 168.4 | 28.0 | 18.1 | 8.6 |
| 189.6 | 38.0 | 8.0 | 8.6 |
| 189.6 | 38.0 | 0.0 | 8.6 |
| 199.3 | 54.0 | 0.0 | 8.6 |
| 203.8 | 64.0 | 0.0 | 8.6 |
| 210.1 | 79.0 | 0.0 | 8.6 |

(14 ) Preparation of inventive emulsion Em-8

A silver halide photographic emulsion comprising core/shell tabular silver halide grains was prepared in the same manner as for inventive emulsion Em-4 except that solution G-6 was used in place of solution G-1 and that addition time, amount of silver added (%), silver iodide content (mol %) and pAg were regulated as shown in Table 3 during silver halide grain growth.

| Solution G-6 | |
|---|---|
| Seed emulsion T-6 | 0.0694 mol |

Table 4 shows data on major properties of silver halide photographic emulsions Em-1 through Em-8.

TABLE 3

| Addition time (min) | Amount of silver added (%) | Silver iodide content (mol %) | pAg |
|---|---|---|---|
| 0.0 | 0.0 | 6.0 | 8.4 |
| 58.6 | 4.0 | 15.2 | 8.4 |
| 113.9 | 11.0 | 30.0 | 8.4 |
| 153.1 | 18.0 | 30.0 | 8.4 |
| 191.4 | 28.0 | 18.1 | 8.4 |
| 215.5 | 38.0 | 8.0 | 8.4 |
| 215.5 | 38.0 | 0.0 | 8.4 |
| 226.5 | 54.0 | 0.0 | 8.4 |
| 231.6 | 64.0 | 0.0 | 8.4 |
| 238.8 | 79.0 | 0.0 | 8.4 |

Silver halide photographic emulsions Em-1 through Em-8 were each subjected to chemical sensitization optimally. These emulsions are expressed as emulsion A in the following sample formulation.

Layers of the following compositions were sequentially formed on a triacetyl cellulose film support in the order from the support side to yield multiple layered color photographic light-sensitive material sample Nos. 11 through 18.

The amount of addition in silver halide photographic light-sensitive material is expressed in gram per $m^2$ unless otherwise stated. The figures for silver halide and colloidal silver have been converted to the amounts of silver. Figures for the amount of sensitizing dyes are shown in mol per mol of silver in the same layer.

| | |
|---|---|
| **Layer 1: Anti-halation layer** | |
| Black colloidal silver | 0.16 |
| UV absorbent UV-1 | 0.20 |
| High boiling solvent Oil-1 | 0.16 |
| Gelatin | 1.23 |
| **Layer 2: Interlayer** | |
| Compound SC-1 | 0.15 |
| High boiling solvent Oil-2 | 0.17 |
| Gelatin | 1.27 |
| **Layer 3: Low speed red-sensitive emulsion layer** | |
| Silver iodobromide emulsion (average grain size 0.38 μm, silver iodide content 8.0 mol %) | 0.50 |
| Silver iodobromide emulsion (average grain size 0.27 μm, silver iodide content 2.0 mol %) | 0.21 |
| Sensitizing dye SD-1 | $2.8 \times 10^{-4}$ |
| Sensitizing dye SD-2 | $1.9 \times 10^{-4}$ |
| Sensitizing dye SD-3 | $1.9 \times 10^{-5}$ |
| Sensitizing dye SD-4 | $1.0 \times 10^{-4}$ |
| Cyan coupler C-1 | 0.48 |
| Cyan coupler C-2 | 0.14 |
| Colored cyan coupler CC-1 | 0.021 |
| DIR compound D-1 | 0.020 |
| High boiling solvent Oil-1 | 0.53 |
| Gelatin | 1.30 |
| **Layer 4: Moderate speed red-sensitive emulsion layer** | |
| Silver iodobromide emulsion (average grain size 0.52 μm, silver iodide content 8.0 mol %) | 0.62 |
| Silver iodobromide emulsion (average grain size 0.38 μm, silver iodide content 8.0 mol %) | 0.27 |
| Sensitizing dye SD-1 | $2.3 \times 10^{-4}$ |
| Sensitizing dye SD-2 | $1.2 \times 10^{-4}$ |
| Sensitizing dye SD-3 | $1.6 \times 10^{-5}$ |
| Sensitizing dye SD-4 | $1.2 \times 10^{-4}$ |
| Cyan coupler C-1 | 0.15 |
| Cyan coupler C-2 | 0.18 |
| Colored cyan coupler CC-1 | 0.030 |
| DIR compound D-1 | 0.013 |
| High boiling solvent Oil-1 | 0.30 |
| Gelatin | 0.93 |

TABLE 4

| | | Ratio (%) of tabular grains area to total projected area | Average grain size (μm) | Average aspect ratio | Grain size distribution | Maximum silver iodide content (mol %) in inner silver iodobromide phase | Average silver iodide content (mol %) | Average distance between two or more twin planes parallel to major plane (Å) |
|---|---|---|---|---|---|---|---|---|
| Em-1 | Comparative | 75 | 1.5 | 3.5 | 22 | 20 | 6.2 | 600 |
| Em-2 | Comparative | 93 | 1.05 | 6.9 | 26 | 20 | 6.1 | 60 |
| Em-3 | Inventive | 81 | 1.32 | 3.0 | 18 | 30 | 8.2 | 400 |
| Em-4 | Inventive | 85 | 1.42 | 3.6 | 16 | 30 | 8.2 | 300 |
| Em-5 | Inventive | 89 | 1.45 | 3.9 | 12 | 30 | 8.2 | 250 |
| Em-6 | Inventive | 92 | 1.44 | 3.8 | 13 | 30 | 8.2 | 200 |
| Em-7 | Inventive | 90 | 1.52 | 4.3 | 15 | 30 | 8.2 | 180 |
| Em-8 | Inventive | 88 | 1.46 | 4.0 | 18 | 30 | 8.2 | 150 |

-continued

| | |
|---|---|
| **Layer 5: High speed red-sensitive emulsion layer** | |
| Silver iodobromide emulsion (average grain size 1.0 μm, silver iodide content 8.0 mol %) | 1.27 |
| Sensitizing dye SD-1 | $1.3 \times 10^{-4}$ |
| Sensitizing dye SD-2 | $1.3 \times 10^{-4}$ |
| Sensitizing dye SD-3 | $1.6 \times 10^{-5}$ |
| Cyan coupler C-2 | 0.12 |
| Colored cyan coupler CC-1 | 0.013 |
| High boiling solvent Oil-1 | 0.14 |
| Gelatin | 0.91 |
| **Layer 6: Interlayer** | |
| Compound SC-1 | 0.09 |
| High boiling solvent Oil-2 | 0.11 |
| Gelatin | 0.80 |
| **Layer 7: Low speed green-sensitive emulsion layer** | |
| Silver iodobromide emulsion (average grain size 0.38 μm, silver iodide content 8.0 mol %) | 0.61 |
| Silver iodobromide emulsion (average grain size 0.27 μm, silver iodide content 2.0 mol %) | 0.20 |
| Sensitizing dye SD-4 | $7.4 \times 10^{-5}$ |
| Sensitizing dye SD-5 | $6.6 \times 10^{-4}$ |
| Magenta coupler M-1 | 0.18 |
| Magenta coupler M-2 | 0.44 |
| Colored magenta coupler CM-1 | 0.12 |
| High boiling solvent Oil-2 | 0.75 |
| Gelatin | 1.95 |
| **Layer 8: Moderate speed green-sensitive emulsion layer** | |
| Silver iodobromide emulsion (average grain size 0.59 μm, silver iodide content 8.0 mol %) | 0.87 |
| Sensitizing dye SD-6 | $2.4 \times 10^{-4}$ |
| Sensitizing dye SD-7 | $2.4 \times 10^{-4}$ |
| Magenta coupler M-1 | 0.058 |
| Magenta coupler M-2 | 0.13 |
| Colored magenta coupler CM-1 | 0.070 |
| DIR compound D-2 | 0.025 |
| DIR compound D-3 | 0.002 |
| High boiling solvent Oil-2 | 0.50 |
| Gelatin | 1.00 |
| **Layer 9: High speed green-sensitive emulsion layer** | |
| Silver iodobromide emulsion (emulsion A) | 1.27 |
| Sensitizing dye SD-6 | $1.4 \times 10^{-4}$ |
| Sensitizing dye SD-7 | $1.4 \times 10^{-4}$ |
| Magenta coupler M-2 | 0.084 |
| Magenta coupler M-3 | 0.064 |
| Colored magenta coupler CM-1 | 0.012 |
| High boiling solvent Oil-1 | 0.27 |
| High boiling solvent Oil-2 | 0.12 |
| Gelatin | 1.00 |
| **Layer 10: Yellow filter layer** | |
| Yellow colloidal silver | 0.08 |
| Anti-color staining agent SC-2 | 0.15 |
| Formalin scavenger HS-1 | 0.20 |
| High boiling solvent Oil-2 | 0.19 |
| Gelatin | 1.10 |
| **Layer 11: Interlayer** | |
| Formalin scavenger HS-1 | 0.20 |

-continued

| | |
|---|---|
| Gelatin | 0.60 |
| **Layer 12: Low speed blue-sensitive emulsion layer** | |
| Silver iodobromide emulsion (average grain size 0.38 μm, silver iodide content 8.0 mol %) | 0.22 |
| Silver iodobromide emulsion (average grain size 0.27 μm, silver iodide content 2.0 mol %) | 0.03 |
| Sensitizing dye SD-8 | $4.9 \times 10^{-4}$ |
| Yellow coupler Y-1 | 0.75 |
| DIR compound D-1 | 0.010 |
| High boiling solvent Oil-2 | 0.30 |
| Gelatin | 1.20 |
| **Layer 13: Moderate speed blue-sensitive emulsion layer** | |
| Silver iodobromide emulsion (average grain size 0.59 μm, silver iodide content 8.0 mol %) | 0.30 |
| Sensitizing dye SD-8 | $1.6 \times 10^{-4}$ |
| Sensitizing dye SD-9 | $7.2 \times 10^{-5}$ |
| Yellow coupler Y-1 | 0.10 |
| DIR compound D-1 | 0.010 |
| High boiling solvent Oil-2 | 0.046 |
| Gelatin | 0.47 |
| **Layer 14: High speed blue-sensitive emulsion layer** | |
| Silver iodobromide emulsion (average grain size 1.0 μm, silver iodide content 8 mol %) | 0.85 |
| Sensitizing dye SD-8 | $7.3 \times 10^{-5}$ |
| Sensitizing dye SD-9 | $2.8 \times 10^{-5}$ |
| Yellow coupler Y-1 | 0.11 |
| High boiling solvent Oil-2 | 0.046 |
| Gelatin | 0.80 |
| **Layer 15: First protective layer** | |
| Silver iodobromide emulsion (average grain size 0.08 μm, silver iodide content 1.0 mol %) | 0.40 |
| UV absorbent UV-1 | 0.065 |
| UV absorbent UV-2 | 0.10 |
| High boiling solvent Oil-1 | 0.07 |
| High boiling solvent Oil-3 | 0.07 |
| Formalin scavenger HS-1 | 0.40 |
| Gelatin | 1.31 |
| **Layer 16: Second protective layer** | |
| Alkali-soluble matting agent (average grain size 2 μm) | 0.15 |
| Polymethyl methacrylate (average grain size 3 μm) | 0.04 |
| Lubricant WAX-1 | 0.04 |
| Gelatin | 0.55 |

In addition to these compositions, a coating aid Su-1, a dispersing agent Su-2, a viscosity regulator, hardeners H-1 and H-2, a stabilizer ST-1, an antifogging agent AF-1 and two kinds of AF-2 having an average molecular weight of 10,000 or 1,100,000, respectively, and a preservative DI-1 were added to appropriate layers. The amount of DI-1 added was 9.4 mg/m$^2$.

The structural formulas of the compounds used in the above sample are given below.

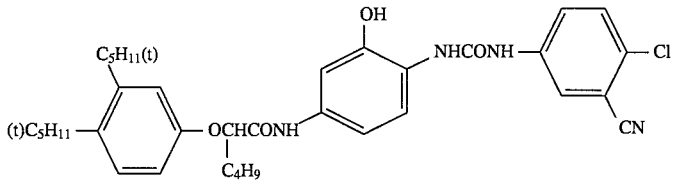

C-1

-continued
C-2
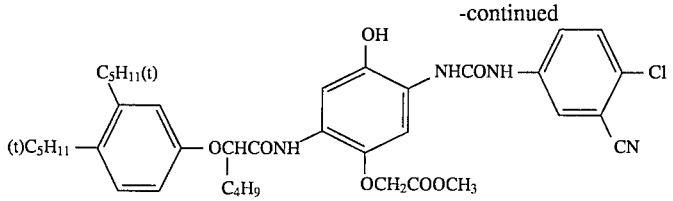
M-1
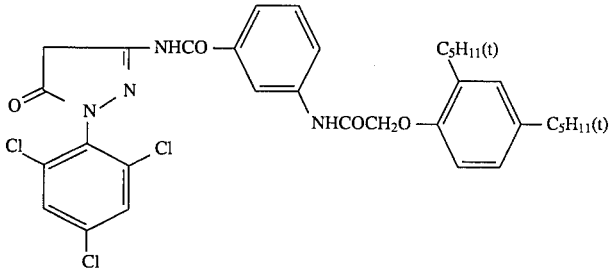
M-2
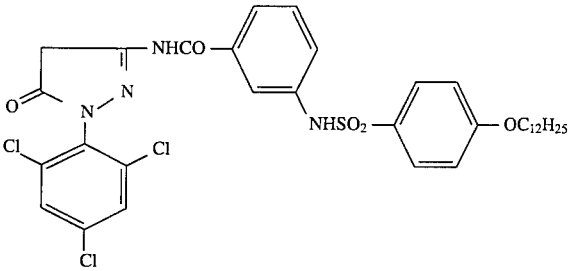
M-3
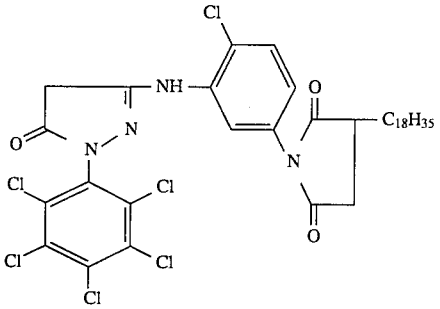
Y-1
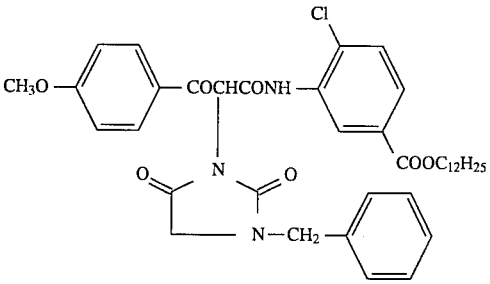

-continued
CC-1
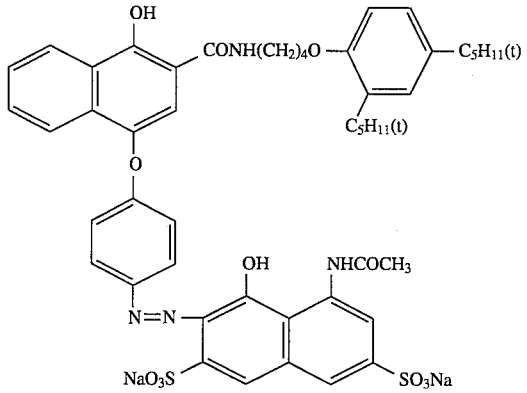
CM-1
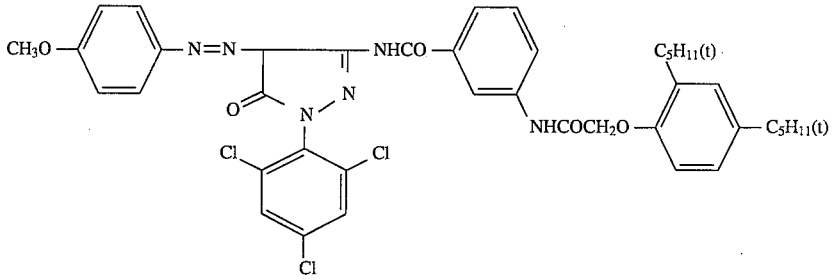
D-1
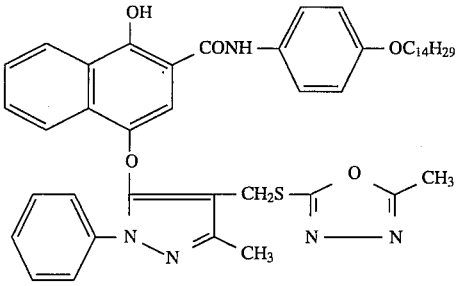
D-2
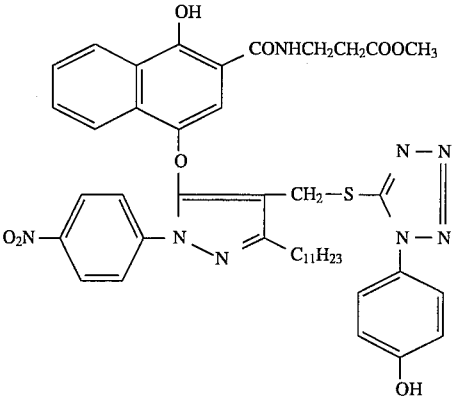

-continued
D-3
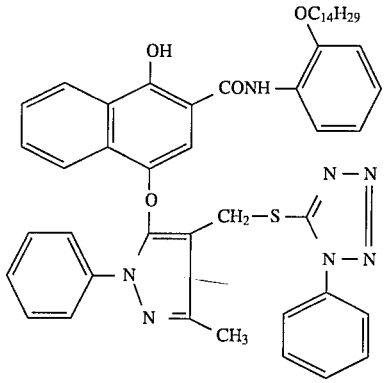
Oil-1
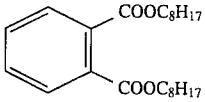
Oil-2
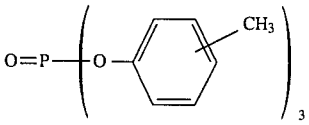
Oil-3
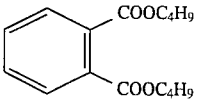
SC-1
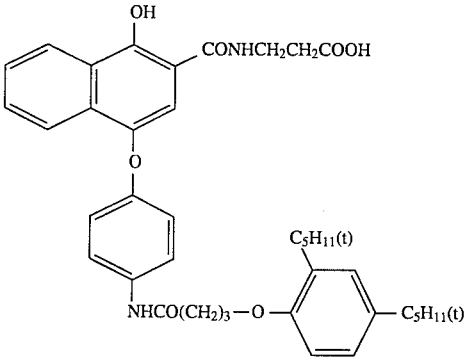
SC-2
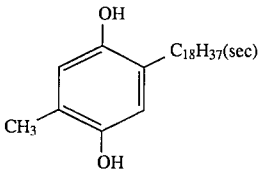
UV-1
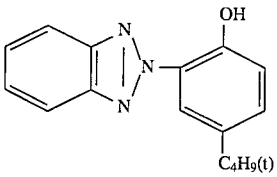
UV-2
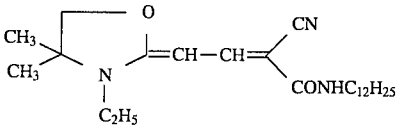

-continued
WAX-1
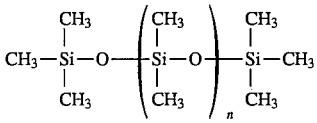
Weight-average molecular weight Mw = 3,000
SU-1
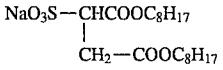
SU-2
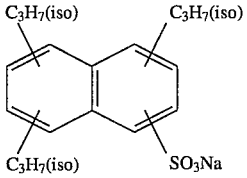
HS-1
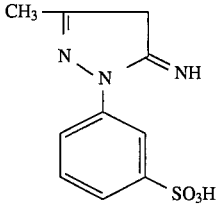
SD-1
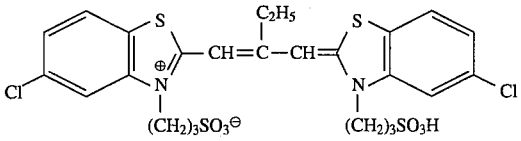
SD-2
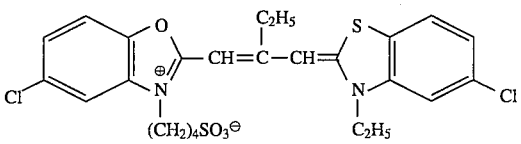
SD-3
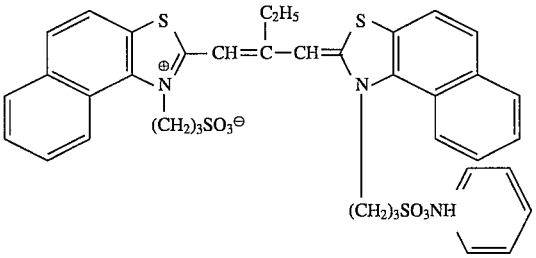
SD-4
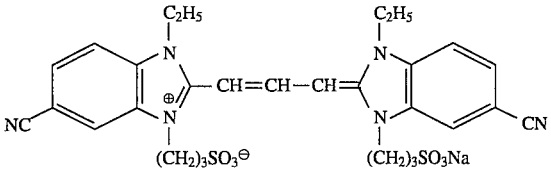
SD-5
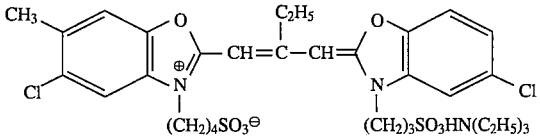
SD-6
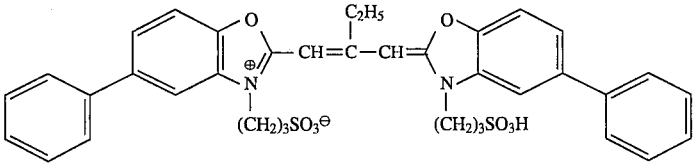

-continued

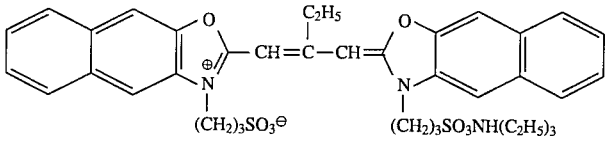

SD-7

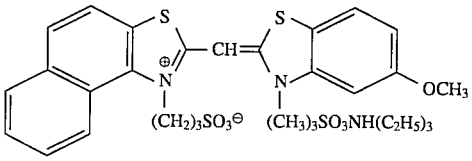

SD-8

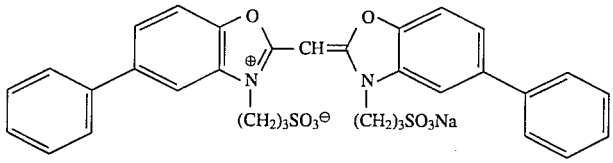

SD-9

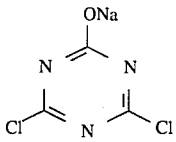

H-1

$(CH_2{=}CHSO_2CH_2)_2O$

H-2

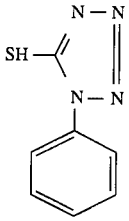

AF-1

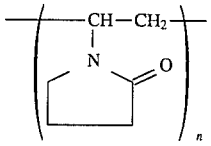

AF-2 n: degree of polymerization (A mixture of the following 3 components)

DI-1

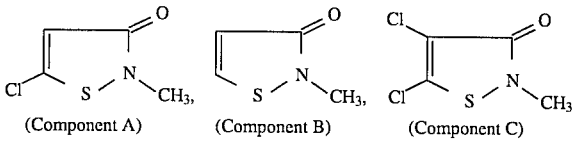

(Component A) (Component B) (Component C)

Components, A:B:C = 50:64:4 (in mol ratio)

Each sample was stored under the following two sets of conditions (conditions A and B), after which it was subjected to sensitometric exposure to white light, processed by the processing steps shown below, and then evaluated as to sensitivity and RMS graininess.

Conditions

A: Stored at 40° C. and 60% RH for 3 days.

B: Stored at 40° C. and 55% RH for 28 days.

| Processing step (38° C.) | |
|---|---|
| Color development | 3 minutes 15 seconds |
| Bleaching | 6 minutes 30 seconds |
| Washing | 3 minutes 15 seconds |
| Fixation | 6 minutes 30 seconds |
| Washing | 3 minutes 15 seconds |
| Stabilization | 1 minutes 30 seconds |
| Drying | |

The processing solutions used in the respective processes had the following compositions.

| Color developer | |
|---|---|
| 4-amino-3-methyl-N-ethyl-N-(β-hydroxyethyl)-aniline sulfate | 4.75 g |
| Anhydrous sodium sulfite | 4.25 g |
| Hydroxylamine.½ sulfate | 2.0 g |
| Anhydrous potassium carbonate | 37.5 g |
| Sodium bromide | 1.3 g |
| Trisodium nitrilotriacetate monohydrate | 2.5 g |
| Potassium hydroxide | 1.0 g |

Water was added to make a total quantity of 1 1, and the solution was adjusted to pH 10.0.

| Bleacher | |
|---|---|
| Ammonium iron ethylenediaminetetraacetate | 100.0 g |
| Diammonium ethylenediaminetetraacetate | 10.0 g |
| Ammonium bromide | 150.0 g |
| Glacial acetic acid | 10.0 g |

Water was added to make a total quantity of 1 1, and aqueous ammonia was added to obtain a pH of 6.0.

| Fixer | |
|---|---|
| Ammonium thiosulfate | 175.0 g |
| Anhydrous sodium sulfite | 8.5 g |
| Sodium metasulfite | 2.3 g |

Water was added to make a total quantity of 1 1, and acetic acid was added to obtain a pH of 6.0.

| Stabilizer | |
|---|---|
| Formalin (37% aqueous solution) | 1.5 ml |
| Konidax (produced by Konica Corporation) | 7.5 ml |

Water was added to make a total quantity of 1 1.

Sensitivity (S) was obtained as a relative value of the reciprocal of the exposure amount yielding a density equivalent to fogging density+0.1, expressed as percent value relative to the green color sensitivity of sample No. 11 under conditions A.

RMS graininess was determined by scanning an area of a density equivalent to minimum density+1.0 in each sample, using a microdensitometer with an opening scanning area of 250 $\mu m^2$,and results were obtained as 1000-fold values of density variance, expressed as percent value relative to the RMS value of sample No. 11 under conditions A.

Table 5 shows the results of evaluation of sensitivity and RMS graininess of coated sample Nos. 1 through 18, incorporating emulsion A or one of emulsions Em-1 through Em-8.

TABLE 5

| Sample No | Emulsion A No. | Conditions A Sensitivity | Conditions A RMS Graininess | Conditions B Sensitivity | Conditions B RMS Graininess |
|---|---|---|---|---|---|
| 11 | Em-1 (comparative) | 100 | 100 | 88 | 114 |
| 12 | Em-2 (comparative) | 92 | 94 | 80 | 105 |
| 13 | Em-3 (inventive) | 111 | 94 | 106 | 100 |

TABLE 5-continued

| Sample No | Emulsion A No. | Conditions A Sensitivity | Conditions A RMS Graininess | Conditions B Sensitivity | Conditions B RMS Graininess |
|---|---|---|---|---|---|
| 14 | Em-4 (inventive) | 113 | 90 | 106 | 97 |
| 15 | Em-5 (inventive) | 120 | 89 | 117 | 94 |
| 16 | Em-6 (inventive) | 125 | 87 | 118 | 94 |
| 17 | Em-7 (inventive) | 121 | 91 | 116 | 95 |
| 18 | Em-8 (inventive) | 118 | 93 | 110 | 101 |

Form Table 5, it is seen that when stored under conditions A, sample Nos. 13 through 18, incorporating inventive silver halide photographic emulsions Em-3 through Em-8, respectively, offered equivalent or higher photographic performance with respect to both sensitivity and RMS graininess, in comparison with the comparative samples incorporating respective comparative emulsions. Moreover, when stored under more severe conditions B, the samples incorporating respective inventive silver halide photographic emulsions surpassed the comparative samples incorporating respective comparative emulsions in photographic performance with respect to both sensitivity and RMS graininess.

What is claimed is:

1. A silver halide photographic light-sensitive emulsion comprising silver halide grains in a dispersion medium, at least 50% of the total projected area of said silver halide grains being occupied by tabular silver halide grains having an aspect ratio of at least 1.3, an average silver iodide content in the range of 4 mol % to a solid solution limit, said silver halide grains each having at least one pair of twin planes parallel to a major plane of said tabular silver halide grains, an average distance between adjacent twin planes being 130 Å to 500 Å, a grain size distribution of said tabular silver halide grains being less than 20%.

2. The emulsion of claim 1 wherein said tabular silver halide grains each has one pair of twin planes parallel to a major plane of said tabular silver halide grains.

3. The silver halide photographic light-sensitive emulsion of claim 1, wherein said tabular silver halide grains have inside a silver iodobromide phase containing silver iodide at not less than 10 mol % and not more than a solid solution limit of said tabular silver halide grain.

4. The silver halide photographic light-sensitive emulsion of claim 1, wherein said average distance between the two or more twin planes is not less than 150 Å and not more than 400 Å.

5. The silver halide photographic light-sensitive emulsion of claim 1, wherein said average distance between the two or more twin planes is not less than 170 Å and not more than 300 Å.

6. The silver halide photographic light-sensitive emulsion of claim 1, wherein at least 60% of the total projected areas of the silver halide grains are occupied by said tabular silver halide grains.

7. The silver halide photographic light-sensitive emulsion of claim 1, wherein at least 70% of the total projected areas of the silver halide grains are occupied by said tabular silver halide grains.

8. The silver halide photographic light-sensitive emulsion of claim 1, wherein at least 80% of the total projected areas of the silver halide grains are occupied by said tabular silver halide grains.

9. The silver halide photographic light-sensitive emulsion of claim 1, wherein an average aspect ratio of said tabular silver halide grains is not less than 1.5 and less than 5.

10. The silver halide photographic light-sensitive emulsion of claim 1, wherein an average aspect ratio of said tabular silver halide grains is not less than 1.7 and less than 5.

11. The silver halide photographic light-sensitive emulsion of claim 1, wherein an average aspect ratio of said tabular silver halide grains is not less than 2.0 and less than 4.5.

12. The silver halide photographic light-sensitive emulsion of claim 1, wherein a diameter of said silver halide grain is within the range of 0.1μm to 5.0 μm.

13. The silver halide photographic light-sensitive emulsion of claim 1, wherein a diameter of said silver halide grain is within the range of 0.2 μm to 4.0 μm.

14. The silver halide photographic light-sensitive emulsion of claim 1, wherein a diameter of said silver halide grain is within the range of 0.3 μm to 3.0 μm.

15. The silver halide photographic light-sensitive emulsion of claim 1, wherein said tabular silver halide grains have inside a silver iodobromide phase containing silver iodide at not less than 15 mol % and not more than a solid solution limit of said tabular silver halide grain.

16. The silver halide photographic light-sensitive emulsion of claim 1, wherein said silver halide emulsion is produced by an acidic method or a neutral method.

17. A silver halide multilayer photographic material comprising the silver halide photosensitive light-emulsion of claim 1.

18. The silver halide photographic light-sensitive emulsion of claim 1 containing a silver halide emulsion selected from silver bromide, silver iodobromide, or silver chloroiodobromide.

19. A silver halide photographic light-sensitive emulsion comprising silver halide grains in a dispersion medium, wherein at least 60% of a total projected area of said silver halide grains is occupied by tabular silver halide grains having an aspect ratio of at least 1.3, an average silver iodide content in the range of 4 mol % to a solid solution limit, said tabular silver halide grains each having at least one pair of twin planes parallel to a major plane of said tabular silver halide grains, an average distance between adjacent twin planes being 150 Å to 400 Å, a grain size distribution of said tabular silver halide grains being less than 20%.

20. A silver halide multilayer photographic material comprising the silver halide photosensitive light-sensitive emulsion of claim 19.

* * * * *